US012426008B2

(12) United States Patent
Wu et al.

(10) Patent No.: US 12,426,008 B2
(45) Date of Patent: Sep. 23, 2025

(54) ENHANCED PAGING PROCEDURE FOR RANDOM ACCESS OR SMALL DATA TRANSMISSION

(71) Applicant: Nokia Technologies Oy, Espoo (FI)

(72) Inventors: Dawei Wu, Beijing (CN); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 362 days.

(21) Appl. No.: 18/019,535

(22) PCT Filed: Aug. 6, 2020

(86) PCT No.: PCT/CN2020/107371

§ 371 (c)(1),
(2) Date: Feb. 3, 2023

(87) PCT Pub. No.: WO2022/027422

PCT Pub. Date: Feb. 10, 2022

(65) Prior Publication Data

US 2023/0292286 A1 Sep. 14, 2023

(51) Int. Cl.

*H04W 76/20* (2018.01)
*H04W 56/00* (2009.01)

(Continued)

(52) U.S. Cl.

CPC ....... *H04W 68/02* (2013.01); *H04W 56/0045* (2013.01); *H04W 72/1268* (2013.01); *H04W 76/20* (2018.02)

(58) Field of Classification Search

CPC ............. H04W 68/02; H04W 56/0045; H04W 72/1268; H04W 76/20; H04W 72/23;

(Continued)

(56) References Cited

U.S. PATENT DOCUMENTS 9,622,286 B2 4/2017 Häkkinen et al.
2016/0338005 A1* 11/2016 Lim ........................ H04W 4/70

(Continued)

FOREIGN PATENT DOCUMENTS

CN 103024924 A 4/2013
CN 105706507 A 6/2016

(Continued)

OTHER PUBLICATIONS

3GPP (Stage-2 running CR for 2-step RACH, R2-1915889, Nov. 2019).*

(Continued)

*Primary Examiner* — Lakeram Jangbahadur

(74) *Attorney, Agent, or Firm* — Carter, DeLuca & Farrell LLP

(57) ABSTRACT

Disclosed are devices supporting an enhanced paging procedure for random access or small data transmission. An example UE may include at least one processor and at least one memory including computer program code. The at least one memory and the computer program code may be configured to, with the at least one processor, cause the UE to receive a paging message from a network device and transmit a signal to the network device using an UL grant. The paging message may include an identity of the UE (UE ID) and the UL grant. The related methods, apparatuses and computer program products are also disclosed.

1 Claim, 10 Drawing Sheets

BS 140
UE 120
210. initial random access
212. mode indicator
214. store mode indicator of UE
218. store UE's ID, TA
216. go into idle or inactive
220. paging for UE
222. check mode indicator of UE
224. allocate UL grant and RRC resource
226. enhanced paging (rrcSetup/Resume)
228. adjust timing based on TA
230. RRC response
232. enter into connected

(51) Int. Cl.
*H04W 68/02* (2009.01)
*H04W 72/1268* (2023.01)

(58) Field of Classification Search
CPC . H04W 74/0808; H04W 76/19; H04W 76/27; H04W 68/00; H04L 1/1887
See application file for complete search history.

(56) References Cited

U.S. PATENT DOCUMENTS

| | | | | |
|---|---|---|---|---|
| 2018/0192436 | A1 | 7/2018 | Yi et al. | |
| 2018/0249439 | A1 | 8/2018 | Xu et al. | |
| 2018/0288734 | A1 | 10/2018 | Islam et al. | |
| 2019/0200410 | A1* | 6/2019 | Höglund | H04W 76/10 |
| 2019/0223160 | A1 | 7/2019 | He et al. | |
| 2020/0221508 | A1* | 7/2020 | Huang | H04W 72/23 |
| 2021/0410181 | A1* | 12/2021 | Jeon | H04W 72/1268 |
| 2022/0110139 | A1* | 4/2022 | Pham Van | H04W 74/04 |

FOREIGN PATENT DOCUMENTS

| | | | |
|---|---|---|---|
| CN | 106465352 | A | 2/2017 |
| CN | 108076513 | A | 5/2018 |
| CN | 108353379 | A | 7/2018 |
| CN | 108616985 | A | 10/2018 |
| CN | 108668359 | A | 10/2018 |
| CN | 108713337 | A | 10/2018 |
| CN | 109219133 | A | 1/2019 |
| CN | 109429372 | A | 3/2019 |
| CN | 110062391 | A | 7/2019 |
| CN | 110493870 | A | 11/2019 |
| CN | 110536286 | A | 12/2019 |
| CN | 110831197 | A | 2/2020 |
| CN | 110958670 | A | 4/2020 |
| CN | 110999438 | A | 4/2020 |
| CN | 111093261 | A | 5/2020 |
| CN | 111149415 | A | 5/2020 |
| WO | WO 2015/013976 | A1 | 2/2015 |
| WO | 2019/082122 | A1 | 5/2019 |
| WO | 2020/093316 | A1 | 5/2020 |
| WO | 2020/102685 | A1 | 5/2020 |

OTHER PUBLICATIONS

Notice of Allowance received for corresponding European Patent Application No. 20947891.6, dated Dec. 13, 2024, 7 pages.

"Discussion on enhanced paging mechanism for handling RAN-initiated paging failure", 3GPP TSG-RAN WG2 Meeting #101, R2-1802009, Agenda Item: 10.4.1.7.4, ASTRI, Feb. 26-Mar. 2, 2018, pp. 1-5.

Office action received for corresponding Chinese Patent Application No. 202080104371.8, dated May 20, 2024, 12 pages, no translation available.

"Considerations on NR-U Paging", 3GPP TSG-RAN WG2 Meeting #104, R2-1817471, Agenda Item: 11.2.2.1, Apple Inc, Nov. 12-16, 2018, pp. 1-5.

"Options comparison for MT EDT", 3GPP TSG-RAN2 meeting#104, R2-1816884, Agenda Item: 12.1.2, ZTE, Nov. 12-16, 2018, 10 pages.

Office action received for corresponding Chinese Patent Application No. 202080104371.8, dated Oct. 25, 2024, 12 pages, no translation available.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"Work Item on NR smalldata transmissions in Inactive state", 3GPP TSG RAN Meeting #86, RP-193252, Agenda Item: 9.1.2, ZTE Corporation, Dec. 9-12, 2019, 4 pages.

Lee et al., "An Efficient Contention Resolution Scheme for Massive IoT Devices in Random Access to LTE-A Networks", IEEE Access, vol. 6, 2018, pp. 67118-67130.

"3rd Generation Partnership Project; Technical Specification Group Core Network and Terminals; Numbering, addressing and identification; (Release 16)", 3GPP TS 23.003, V16.3.0, Jun. 2020, pp. 1-141.

Office Action received for corresponding Japanese Patent Application No. 2023-507613, dated Jan. 9, 2024, 3 pages of Office Action and 2 pages of summary available.

"Stage-2 running CR for 2-step RACH", 3GPP TSG-RAN WG2 Meeting #108, R2-1915889, Nokia, Nov. 18-22, 2019, 9 pages.

Extended European Search Report received for corresponding European Patent Application No. 20947891.6, dated Feb. 28, 2024, 6 pages.

"Further analysis on Performance and Feasibility of service based GWUS", 3GPP TSG-RAN WG2 Meeting #107, R2-1909027, Agenda Item: 12.1.2, Nokia, Aug. 26-30, 2019, 6 pages.

"NR RRC state machine, transitions and signalling procedures", 3GPP TSG-RAN WG2 Meeting #96, R2-167494, Agenda Item: 9.2.2.1, Samsung, Nov. 14-18, 2016, 6 pages.

* cited by examiner

ENHANCED PAGING PROCEDURE FOR RANDOM ACCESS OR SMALL DATA TRANSMISSION

CROSS REFERENCE TO RELATED APPLICATION

This patent application is a U.S. National Stage application of International Patent Application Number PCT/CN2020/107371 filed Aug. 6, 2020, which is hereby incorporated by reference in its entirety.

TECHNICAL FIELD

Various example embodiments described herein generally relate to communication technologies, and more particularly, to methods and apparatuses supporting an enhanced paging procedure for random access or small data transmission of Industrial Internet of Things (IIoT) user equipment (UE).

BACKGROUND

Certain abbreviations that may be found in the description and/or in the figures are herewith defined as follows:

AMF Access and Mobility Management Function
BS Base Station
C-RNTI Cell-Radio Network Temporary Identifier
CN Core Network
eNB 4G Base Station
gNB 5G Base Station
IoT Internet of Things
LTE Long Term Evolution
Msg Message
NB-IoT Narrow Band IoT
NR New Radio
RACH Random Access Channel
PRACH Physical Random Access Channel
PUSCH Physical Uplink Shared Channel
RAR Random Access Response
RRC Radio Resource Control
TA Timing Advance
UE User Equipment Mobile communication will be a key enabler in achieving objectives of the fourth industrial revolution (Industrial 4.0). It goes along with a need for coherent integration and migration strategies to transform existing industrial production, which is mostly based on fixed-line networks, toward the next level of industrial production, which will make use of ubiquitous, highly reliable and ultra-low-latency wireless communication networks. One critical enabler for Industry 4.0 is scalable and pervasive connectivity between machines, people and objects which is called as the Industrial Internet of Things (IIoT), for which wireless connectivity will play a pivotal role. Mobile and wireless communication systems also offer benefits in removing cables from stationary, rotating or other devices with limited mobility. Ubiquitous connectivity is a key characteristic of mobile communication systems, which enables flexible manufacturing setups and reconfiguration not constrained by available cabling. It means that the devices in the factory which were linked with cables before will link via a wireless communication system and follow the wireless system protocols.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a UE is provided. The UE may comprise at least one processor and at least one memory including computer program code. The at least one memory and the computer program code may be configured to, with the at least one processor, cause the UE to receive a paging message from a network device, and transmit a signal to the network device using an UL grant. The paging message may comprise an identity of the UE and the UL grant.

In a second aspect, an example embodiment of a network device is provided. The network device may comprise at least one processor and at least one memory including computer program code. The at least one memory and the computer program code may be configured to, with the at least one processor, cause the network device to allocate an UL grant for a UE, transmit a paging message to the UE, and receive a signal transmitted from the UE using the UL grant. The paging message may comprise an identity of the UE and the UL grant.

In a third aspect, an example embodiment of a method implemented at a UE is provided. The method may comprise receiving a paging message from a network device, and transmitting a signal to the network device using an UL grant. The paging message may comprise an identity of the UE and the UL grant.

In a fourth aspect, an example embodiment of a method implemented at a network device is provided. The method may comprise allocating an UL grant for a UE, transmitting a paging message to the UE, and receiving a signal transmitted from the UE using the UL grant. The paging message may comprise an identity of the UE and the UL grant.

In a fifth aspect, an example embodiment of an apparatus implemented at a UE is provided. The apparatus may comprise means for receiving a paging message from a network device, and means for transmitting a signal to the network device using an UL grant. The paging message may comprise an identity of the UE and the UL grant.

In a sixth aspect, an example embodiment of an apparatus implemented at a network device is provided. The apparatus may comprise means for allocating an UL grant for a UE, means for transmitting a paging message to the UE, and means for receiving a signal transmitted from the UE using the UL grant. The paging message may comprise an identity of the UE and the UL grant.

In a seventh aspect, an example embodiment of a computer program product is provided. The computer program product may be embodied in at least one computer readable medium and comprise instructions. The instructions, when executed by at least one processor of a UE, may cause the UE to receive a paging message from a network device, and transmit a signal to the network device using an UL grant. The paging message may comprise an identity of the UE and the UL grant.

In an eighth aspect, an example embodiment of a computer program product is provided. The computer program product may be embodied in at least one computer readable medium and comprise instructions. The instructions, when executed by at least one processor of a network device, may cause the network device to allocate an UL grant for a UE, transmit a paging message to the UE, and receive a signal transmitted from the UE using the UL grant. The paging message may comprise an identity of the UE and the UL grant.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

In 5G/4G and earlier generations of mobile communication systems, when the network wants to connect with a UE, the network will send a paging message to the UE. After receiving the paging message, the UE will perform a random access procedure for the initial access to the network.

Figure 1:
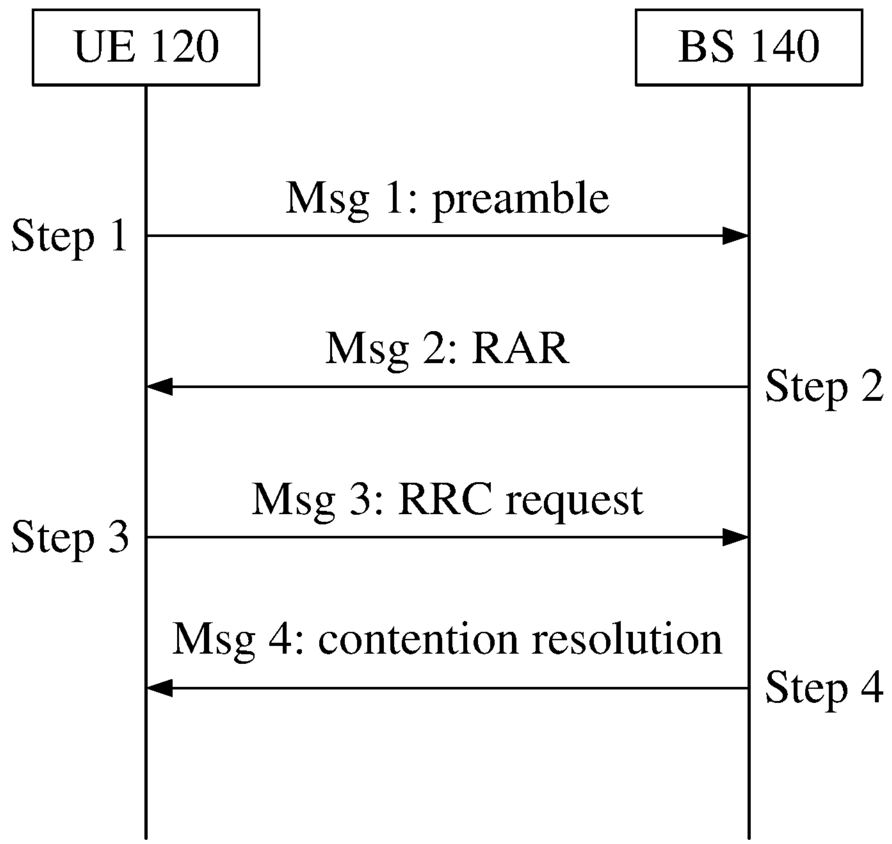
FIG. 1 illustrates an example four step random access procedure.

FIG. 1 illustrates a four-steps random access procedure. As is shown in FIG. 1, in Step 1, a UE 120 transmits to a BS 140 Msg 1 including a preamble on PRACH. In Step 2 the BS 140 transmits to the UE 120 an RAR as Msg 2 including a time-alignment command for adjusting the uplink transmission timing of the UE 120 based on the timing of the received preamble, and an UL Grant. Following Steps 3 and 4 are to resolve contention due to simultaneous transmissions of the same preamble from multiple UEs 120 within a cell. In Step 3, the UE 120 transmits to the BS 140 an RRC connection request as Msg 3 using the UL Grant allocated in Msg 2. In Step 4, the BS 140 transmits an Msg 4 including C-RNTI or identity of a successful connected UE 120 for contention resolution. And there may be an additional Step 5 for transmitting Msg 5 of RRC response from the successful connected UE 120 to the BS 140. In this procedure a collision occurs when a plurality of UEs 120 use the same preamble and begin the random access procedure at the same time due to the limited preamble number (64 or less) and PRACH frequency and timing domain resource. Only one UE 120 among those having collision with each other can connect with the BS 140 while others need to do the random access procedure again.

Figure 2:
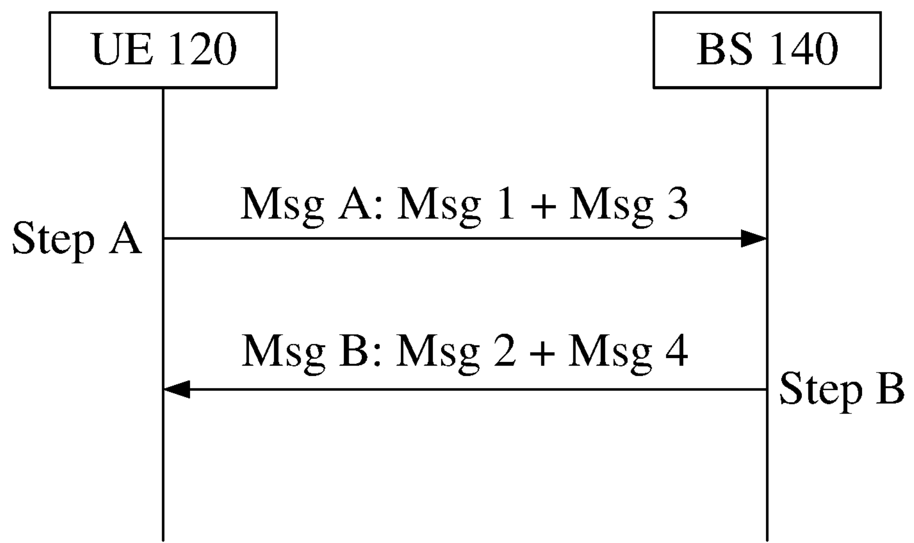
FIG. 2 illustrates an example two step random access procedure for NR.

To shorten time for random access, a two-steps random access procedure has been proposed for NR, which is shown in FIG. 2. Referring to FIG. 2, the UE 120 transmits to the BS 140 an Msg A combining the Msg 1 and Msg 3 in Step A and the BS 140 transmits to the UE 120 an Msg B combining the Msg 2 and Msg 4 in Step B. Compared with the four-steps procedure shown in FIG. 1, the two-steps procedure can reduce the time length of the whole random access procedure, but the collision possibility increases because the Step A needs both PUSCH resource and RACH resource.

Figure 3:
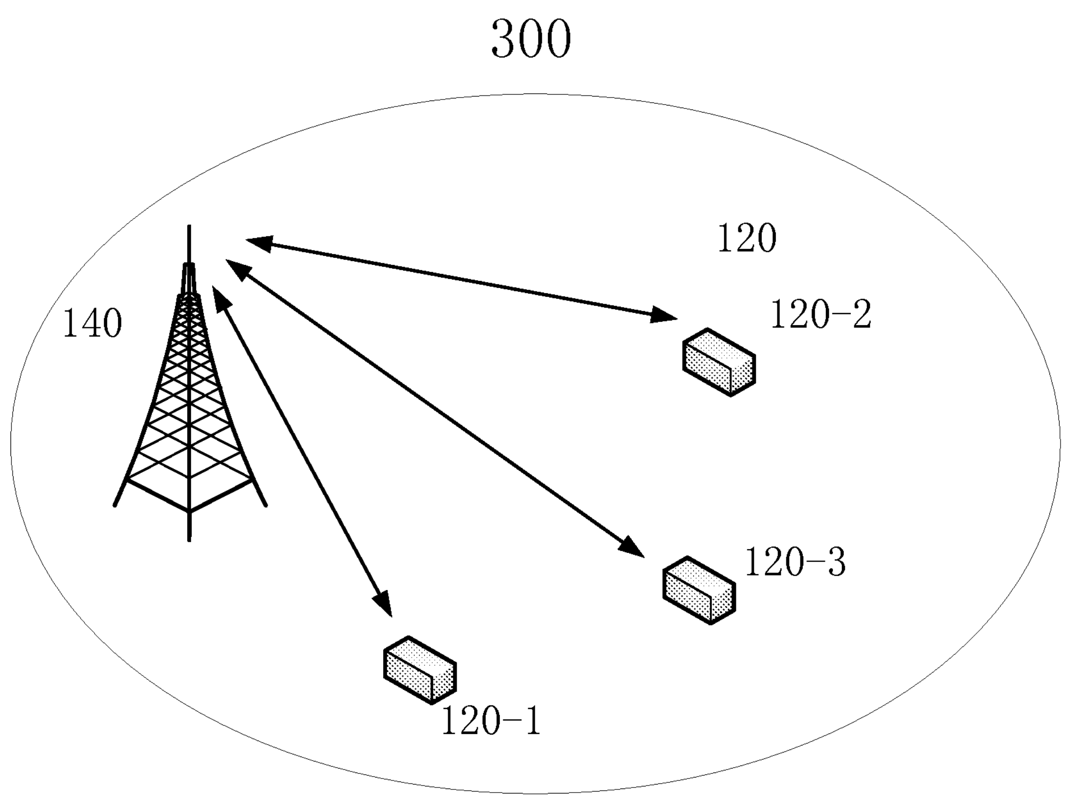
FIG. 3 illustrates an example scenario where embodiments of the present disclosure may be applied.

FIG. 3 illustrates a scenario of example factory 300 where a large number of IIoT devices 120 including for example UEs 120-1, 120-2 and 120-3 connect wirelessly to a BS 140. In the factory 300, the network (the control centre) will trigger the large number of devices 120 to start up and begin or get ready to work at substantially the same time everyday, which means that all the devices 120 commence a random access procedure with the BS 140 at substantially the same time. In a legacy system where the devices 120 are connected with cables, there is no problem for the devices 120 to connect to the network at the same time. But in a wireless system, many devices 120 may fail the contention-based random access procedure because of limited RACH and PUSCH resources, and they need to do the random access procedure again and again. A device which cannot connect to the network on time will also make other devices that depend on its operation cannot work and must wait. It will take a long time to make all the devices 120 connected and ready for work. This is a waste of time and money for the factory.

The IIoT devices 120 may be set in an idle or inactive state for saving power consumption. When a device 120 in the idle or inactive state has UL or DL data to transmit or receive, it needs to setup or resume an RRC connection with the network. The connection setup/resumption and subsequent release/suspension to the idle/inactive state happens for each data transmission, no matter how small and infrequent the data packets are. This results in unnecessary latency, power consumption and signaling overhead.

Embodiments of an enhanced paging procedure will be discussed below. The enhanced paging procedure may be used for, among others, a random access procedure or small data transmission, which can shorten time length and improve efficiency of the procedure, especially for IIoT devices.

Figure 4:
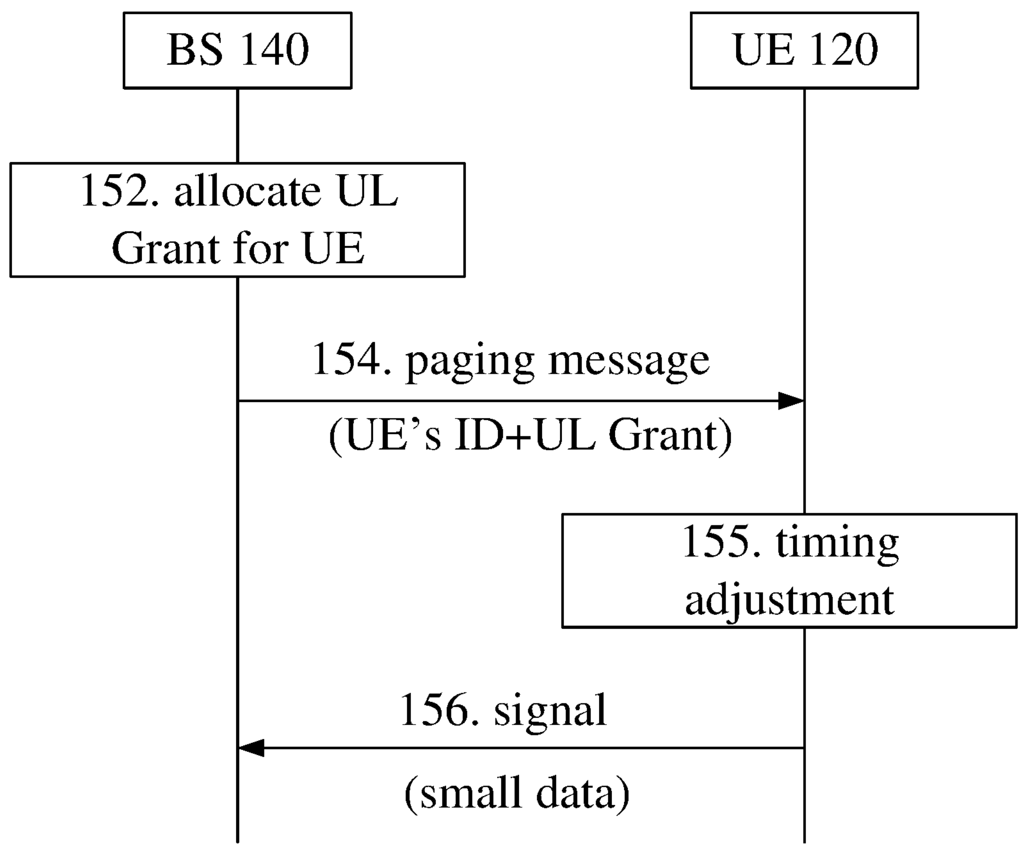
FIG. 4 illustrates an interaction diagram of example operations for an enhanced paging procedure in accordance with some example embodiments.

FIG. 4 illustrates an interaction diagram of example operations between a network device such as the BS 140 and a terminal device such as the UE 120 in an enhanced paging procedure in accordance with some example embodiments.

The enhanced paging procedure may be applied in a scenario for example a factory where the UE 120 does not move or only moves within a limited area when it is in an idle or inactive state. If the UE 120 keeps moving when it is in the idle or inactive state, a legacy paging procedure may be applied. The enhanced paging procedure may be triggered by an access and mobility management function (AMF) sending a legacy paging for the UE 120 to the BS 140, or may be triggered by the BS 140 when the BS 140 has DL data for the UE 120 or needs UL data from the UE 120.

As shown in FIG. 4, in Operation 152, the BS 140 may allocate an UL grant for the UE 120. It is assumed that the UE 120 is in an RRC_IDLE or RRC_INACTIVE state, and the BS 140 is aware of that the UE 120 would not move or only move within a limited area when it is in the idle or inactive state by for example receiving a mode or capability indicator from the UE 120. The allocated UL grant schedules PUSCH resources for the UE 120 to transmit UL signal to the BS 140. In Operation 154, the BS 140 may transmit an enhanced paging message to the UE 120. Compared with a legacy paging message that includes only an identity of the UE, the enhanced paging message transmitted in Operation 154 further includes the UL grant allocated to the UE 120. Then in Operation 156 the UE 120 may transmit a signal to the BS 140 using the UL grant.

The signal 156 may comprise any control signaling or data that the UE 120 needs to transmit to the BS 140. In some embodiments, the signal 156 may comprise small and infrequent data for the BS 140. Thus, UL small data transmission is accomplished while the UE 120 does not need to enter into the RRC_CONNECTED state. It improves the communication efficiency and saves power consumption and signaling overhead incurred by the random access procedure.

In some embodiments, before transmitting the signal 156, the UE 120 adjusts in Operation 155 its uplink transmission timing based on Timing Advance (TA) to compensate for the propagation delay as the signal travels between the UE 120 and the BS 140. The TA may be stored at the BS 140 and/or at the UE 120 when the UE 120 enters into the RRC_IDLE or RRC_INACTIVE state and it has a value that depends on a transmission delay between the UE 120 and the BS 140. As the UE 120 does not move or only moves within a limited area when it is in the idle or inactive state, the TA stored when the UE 120 entered into the idle or inactive state is still applicable throughout the time period that the UE 120 is in the idle or inactive state, and a Random Access (RA) procedure is not needed. And also, the network knows which cell the UE 120 camped recently. In some embodiments, when the UE 120 enters into the idle or inactive state, the cell on which the UE 120 camped will store the UE's ID and TA, and the UE's ID and TA would be included in the paging message 154 together with the UL grant for the UE 120. In some embodiments, the UE 120 may also store its TA when it enters into the idle or inactive state and thus the paging message 154 does not need to include the TA for the UE 120.

Figure 5:
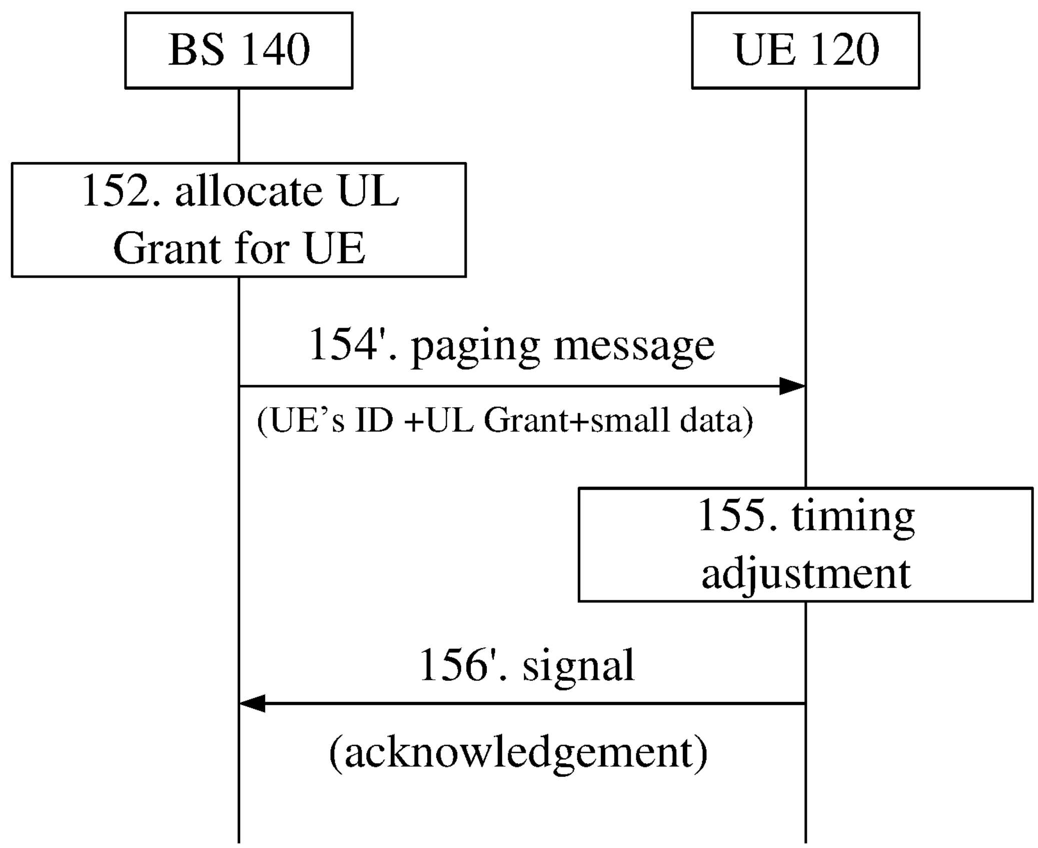
FIG. 5 illustrates an interaction diagram of example operations for an enhanced paging procedure in accordance with some example embodiments.

FIG. 5 illustrates another embodiment of the enhanced paging procedure. The operations in FIG. 5 the same as or similar to those in FIG. 4 are denoted with the same or similar numerals and a repetitive description will be omitted. Hereinafter only difference between the procedures of FIGS. 4-5 will be detailed.

Referring to FIG. 5, the enhanced paging message 154' transmitted from the BS 140 to the UE 120 further includes DL data, RRC signaling or NAS signaling for the UE 120, in addition to the UE's ID and UL grant. The DL data may be any data for the UE 120 and it may originate from the BS 140, the core network or other network or terminal devices. The signal 156' transmitted from the UE 120 to the BS 140 using the UL grant may comprise a response to acknowledge receipt of the paging message 154', UL data, RRC message or NAS signaling. Thus, DL small data transmission is accomplished while the UE 120 does not need to enter into the RRC_CONNECTED state. It improves the communication efficiency and saves power consumption and signaling overhead incurred by the random access procedure.

Figure 6:
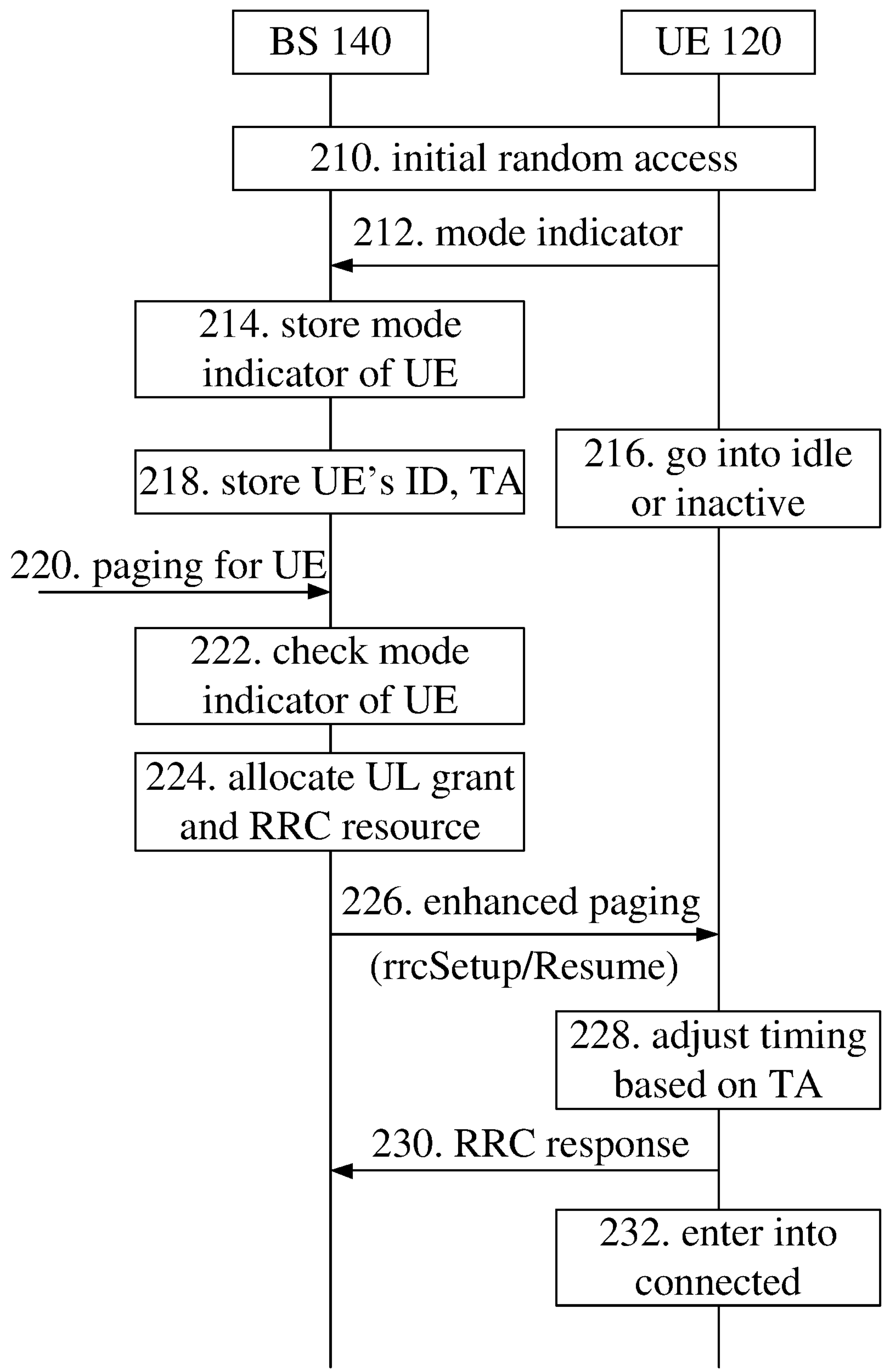
FIG. 6 illustrates an interaction diagram of example operations for random access based on an enhanced paging procedure in accordance with some example embodiments.

The enhanced paging procedure may also be used for random access in a scenario for example the factory 300 where a large number of IIoT devices such as the UEs 120 need to connect to the BS 140 at the same time. FIG. 6 illustrates an interaction diagram of example operations for a random access procedure taking advantage of the enhanced paging in accordance with some example embodiments.

Referring to FIG. 6, when the UE 120 connects to the network of the factory 300 at the very first time, the network does not have any context of the UE 120, and a legacy initial random access procedure may be performed at Operation 210 for the UE 120 to access the network at the BS 140. The legacy initial random access procedure may be a four-steps procedure shown in FIG. 1 or a two-steps procedure shown in FIG. 2.

Then, the UE 120 may transmit a mode indicator or a capability indicator to the BS 140 in Operation 212. The mode/capability indicator indicates that the UE 120 is in a factory working mode and it supports a tailored random access procedure based on the enhanced paging message comprising an UL grant and possibly a TA value. For example, the UE 120 may set an information element (IE), e.g. factoryWorkingMode, to ON and send it as the mode/capability indicator to the BS 140. The UE 120 may send the mode/capability indicator to the BS 140 at any time before it goes into an idle or inactive state. For example, the mode/capability indicator may be included in an RRC setup complete message (Msg5) sent to the BS 140, or it may be sent to the BS 140 when the UE 120 reports its capabilities to the BS 140. The BS 140 stores the mode/capability indicator in Operation 214 when it receives the mode/capability indicator from the UE 120.

It is assumed that the UE 120 goes into an idle or inactive state by releasing or suspending the RRC connection in Operation 216. In Operation 218, the BS 140 may store the UE's 120 ID and TA when the UE 120 goes into the idle or inactive state.

In Operation 220, the BS 140 may receive a legacy paging for the UE 120 from an AMF (not shown). For example, the AMF pages all the UEs 120 of the factory 300 to trigger a random access procedure and makes the UEs 120 get ready for working. When receiving a paging message for the UE 120, the BS 140 checks in Operation 222 the mode/capability indicator of the UE 120 to determine if the UE 120 supports an enhanced paging message. If so, the BS 140 will initiate the enhanced paging for a tailored random access as discussed below. Otherwise, the BS 140 will initiate a legacy paging to trigger a legacy two-step or four-step random access.

It is further assumed that the mode/capability indicator (e.g. factoryWorkingMode) is ON. In Operation 224, the BS 140 may allocate UL grant and RRC resources for the UE 120. If the UE 120 is in the idle state, the BS 140 may also assign a cell specific radio network temporary identifier (C-RNTI) for the UE 120. If the UE 120 is in the inactive state, it still maintains its C-RNTI for the cell it camped and the maintained C-RNTI can be used. In some embodiments, the BS 140 also retrieves TA for the UE 120 if the TA is stored at the BS 140 when the UE 120 goes into the idle or inactive state in Operation 216. The UL grant, the TA and the C-RNTI for the UE 120 may be packaged in Random Access Response (RAR). The allocated RRC resources may be packaged in an RRC setup message if the UE 120 is in the idle state or in an RRC resume message if the UE 120 is in the inactive state. In Operation 226, the BS 140 may transmit an enhanced paging message including the RAR payload (including UL grant and optionally TA and C-RNTI) and the RRC setup or resume message to the UE 120. As such, the enhanced paging message transmitted in Operation 226 combines Msg2 and Msg4 of the legacy random access procedure, and a PRACH preamble is not needed.

In Operation 228, the UE 120 may adjust its transmission timing based on the TA received in the paging message from the BS 140 or stored at the UE 120. In the scenario factory 300, the IIoT UEs do not move or may be moved only within a very limited area when the UEs stop working and stay in the idle or inactive state, so the TA stored when the UE 120 goes in the idle or inactive state can still be used in Operation 228. Then, the UE 120 may transmit an RRC response to the BS 140 using the UL grant in Operation 230 and enter into the RRC_CONNECTED state in Operation 232. The RRC response may include for example an RRC setup or resume complete message.

Compared with the legacy four-steps or two-steps random access procedure, the tailored random access procedure based on the enhanced paging message discussed above includes only one step of transmitting the enhanced paging message. It greatly shortens the time length of the random access procedure. The tailored random access based on the enhanced paging procedure also avoids contention between a number of UEs because the PRACH preamble is not used. Thus, a large number of UEs can connect to the network at the same time. It is especially beneficial for a scenario such as the factory 300 where a large number of IIoT devices need to connect to the network at the same time.

Figure 7:
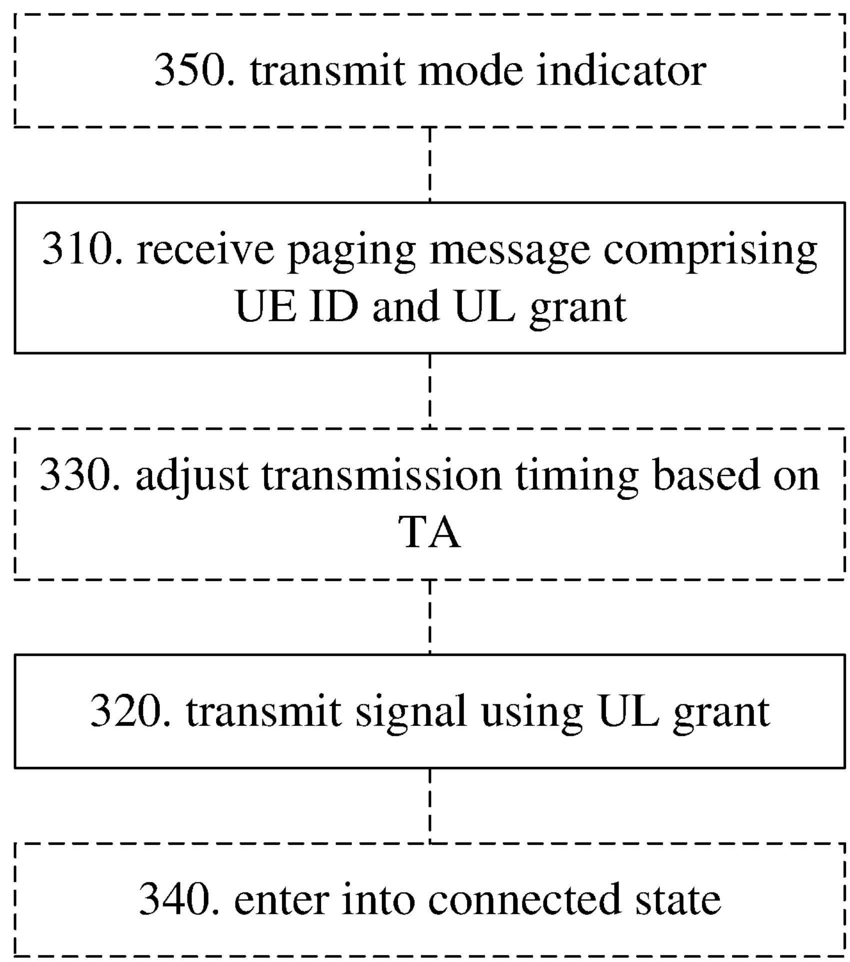
FIG. 7 illustrates a flow chart of an enhanced paging procedure in accordance with some example embodiments.

FIG. 7 illustrates a flow chart of an example method 300 for the enhanced paging procedure in accordance with some example embodiments. For a better understanding, the below description of method 300 may be read also with reference to FIGS. 3-6. The method 300 may be performed for example at an IIoT UE such as the UE 120.

As shown in FIG. 7, the example method 300 may include a step 310 of receiving a paging message from a network device, and a step 320 of transmitting a signal to the network device. The paging message may comprise an identity of the UE and an UL grant allocated for the UE, and the signal may be transmitted using the UL grant. The network device may be for example a BS such as the BS 140, and the signal may comprise any control signaling or uplink data for the BS 140.

In some embodiments, the paging message may further comprise downlink data for the UE. The signal transmitted in the step 320 may comprise a response to acknowledge receipt of the downlink data at the UE.

In some embodiments, the paging message may further comprise an RRC setup or resume message, and the example method 300 may further include a step 340 of entering into a connected state from an idle or inactive state in response to the RRC setup or resume message. In such a case, the signal transmitted to the network device using the UL grant may comprise an RRC setup or resume complete message that is transmitted when the UE enters into the connected state.

In some embodiments, the paging message may further comprise a C-RNTI for the UE. For example, if the UE 120 is in the idle state and is to enter into a connected or inactive state, the C-RNTI for the UE 120 may be included in the paging message.

In some embodiments, the example method 300 may further include a step 330 of adjusting transmission timing based on a TA for the UE, before transmitting the signal 320. The TA may be stored at the network device when the UE goes into an idle or inactive state and received in the paging message from the network device, or stored at the UE when the UE goes into the idle or inactive state.

In some embodiments, the example method 300 may further include a step 350 of transmitting a mode indicator to the network device. The mode indicator may indicate whether the UE is in a mode that supports the paging message comprising an UL grant. When the network device checks the mode/capability indicator and determines that the UE supports the paging message comprising the UL grant, the network device will transmit the paging message in Operation 310.

Figure 8:
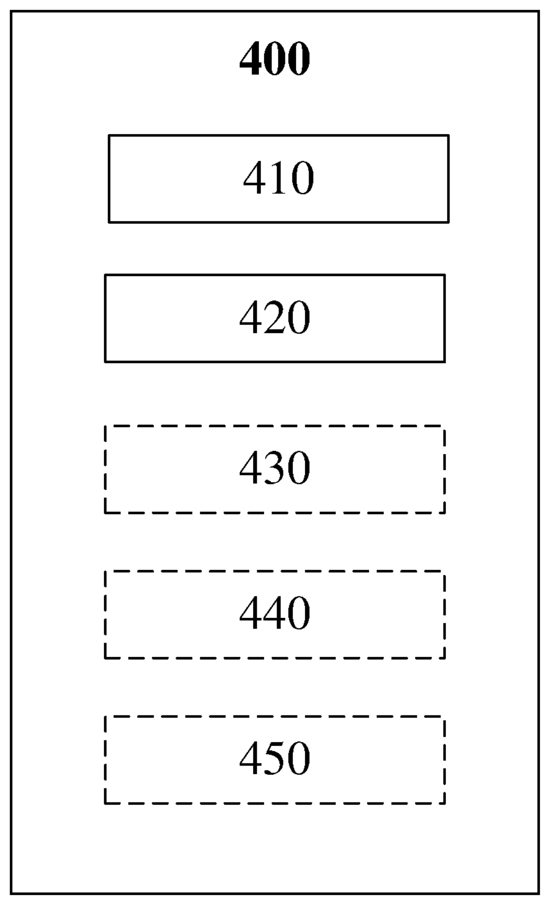
FIG. 8 illustrates a block diagram of an example apparatus in accordance with some example embodiments.

FIG. 8 illustrates a block diagram of an example apparatus 400 in accordance with some example embodiments. The apparatus 400 may be implemented in for example the UE 120 to perform the method 300 shown in FIG. 7. Referring to FIG. 8, the apparatus 400 may include a first means (or module) 410 for performing the step 310, and a second means 420 for performing the step 320. The apparatus 400 may further include a third means 430 for performing the step 330, a fourth means 440 for performing the step 340, and a fifth means 450 for performing the step 350.

Figure 9:
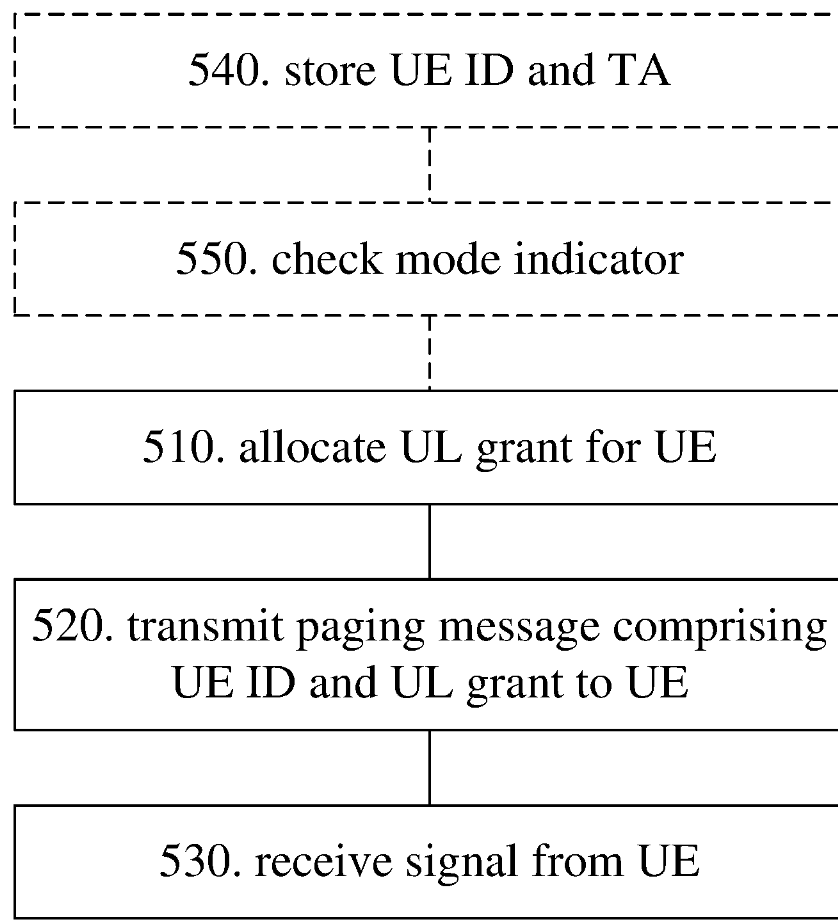
FIG. 9 illustrates a flow chart of an enhanced paging procedure in accordance with some example embodiments.

FIG. 9 illustrates a flow chart of an example method 500 for the enhanced paging procedure in accordance with some example embodiments. For a better understanding, the below description of method 500 may be read also with reference to FIGS. 3-8. The method 500 may be performed for example at a network device such as the BS 140.

As shown in FIG. 9, the example method 500 may include a step 510 of allocating an UL grant for a UE, a step 520 of transmitting a paging message to the UE, and a step 530 of receiving a signal transmitted from the UE using the UL grant. The paging message may comprise an identity of the UE and the UL grant.

In some embodiments, the BS 140 may allocate an UL grant for the UE 120 in response to a legacy paging message including the ID of the UE 120 from for example an AMF function in the core network.

In some embodiments, the example method 500 may further include a step 540 of storing the UE's identity and TA when the UE enters into an idle or inactive state. In such a case, the paging message transmitted in the step 520 may further comprise the TA for the UE. In some embodiments, the TA may be stored at the UE 120 and the paging message transmitted in the step 520 may not include the TA for the UE.

In some embodiments, the paging message may further comprise downlink data for the UE, and the signal received on the UL grant from the UE may comprise a response to acknowledge receipt of the downlink data. Therefore, downlink small data transmission is accomplished while the UE 120 does not need to translate from the idle or inactive state to the connected state.

In some embodiments, the signal received on the UL grant from the UE may comprise uplink data for the network device. Therefore, uplink small data transmission is accomplished while the UE 120 does not need to transition from the idle or inactive state to the connected state.

In some embodiments, the paging message may further comprise an RRC setup or resume message, and the signal received on the UL grant from the UE may comprise an RRC setup or resume complete message.

In some embodiments, the paging message may further comprise a C-RNTI for the UE.

In some embodiments, the example method 500 may further include a step 550 of checking a mode indicator stored at the network device to determine whether the UE is in a mode that supports the paging message comprising an UL grant. The paging message comprising the UL grant is transmitted in the step 520 when it is determined in the step 550 that the UE is in the mode that supports such a paging message.

The steps 510-550 of the method 500 are performed in cooperation with the steps 310-350 of method 300 to implement the enhanced paging procedure discussed above. Thus, various features and aspects described above with respect to the example method 300 are also applicable to or included in the example method 500.

Figure 10:
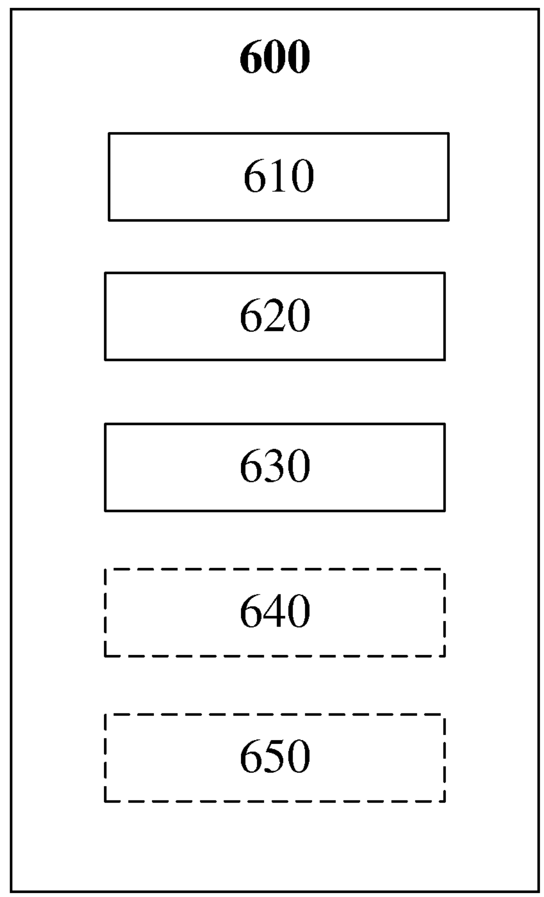
FIG. 10 illustrates a block diagram of an example apparatus in accordance with some example embodiments.

FIG. 10 illustrates a block diagram of an example apparatus 600 in accordance with some example embodiments. The apparatus 600 may be implemented in for example the BS 140 to perform the method 500 shown in FIG. 9. Referring to FIG. 10, the apparatus 600 may include a first means (or module) 610 for performing the step 510, a second means 620 for performing the step 520, and a third means 630 for performing the step 530. Optionally, the apparatus 600 may further include a fourth means 640 for performing the step 540 and a fifth means 650 for performing the step 550.

Figure 11:
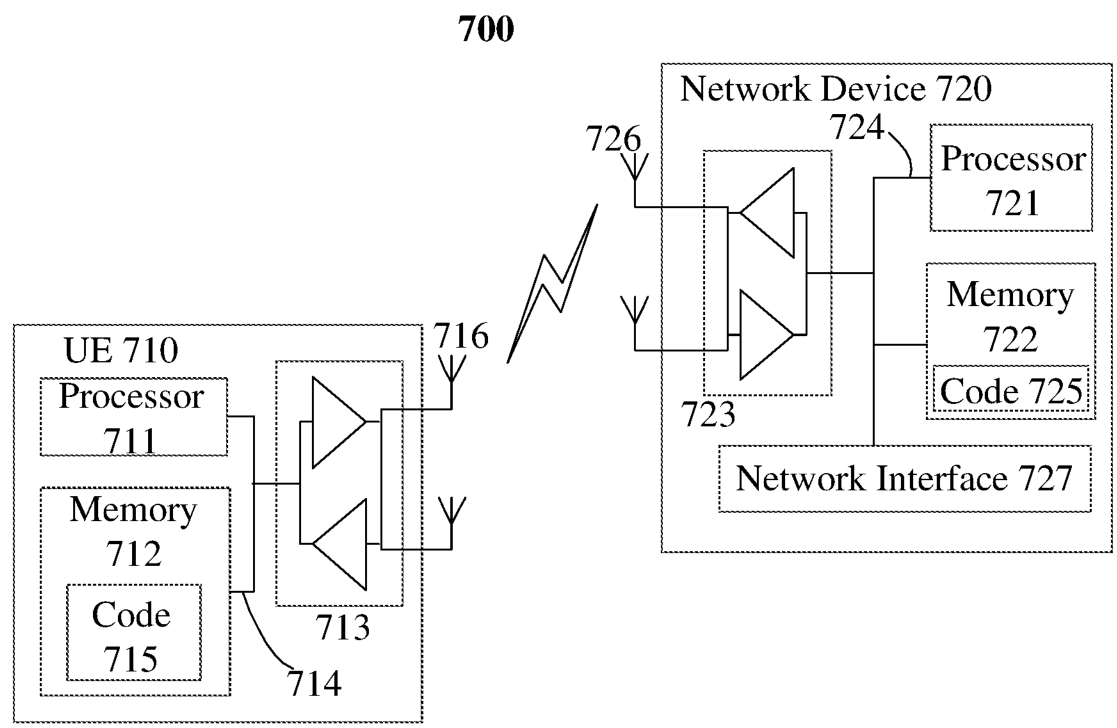
FIG. 11 illustrates a block diagram of an example communication system in which embodiments of the present disclosure can be implemented.

FIG. 11 illustrates a block diagram of an example communication system 700 in which embodiments of the present disclosure can be implemented. As shown in FIG. 11, the communication system 700 may comprise user equipment (UE) 710 which may be implemented as the IIoT UE 120 discussed above, and a network device 720 which may be implemented as the BS 140 discussed above. Although FIG. 11 shows only one UE 710, it would be appreciated that the communication system 700 may comprise a plurality of UEs 710 that wirelessly connect to the network device 720.

Referring to FIG. 11, the UE 710 may comprise one or more processors 711, one or more memories 712 and one or more transceivers 713 interconnected through one or more buses 714. The one or more buses 714 may be address, data, or control buses, and may include any interconnection mechanism such as series of lines on a motherboard or integrated circuit, fiber, optics or other optical communication equipment, and the like. Each of the one or more transceivers 713 may comprise a receiver and a transmitter, which are connected to one or more antennas 716. The UE 710 may wirelessly communicate with the network device 720 through the one or more antennas 716. The one or more memories 712 may include computer program code 715. The one or more memories 712 and the computer program code 715 may be configured to, when executed by the one or more processors 711, cause the user equipment 710 to perform processes and steps relating to the UE 120 as described above.

The network device 720 may comprise one or more processors 721, one or more memories 722, one or more transceivers 723 and one or more network interfaces 727 interconnected through one or more buses 724. The one or more buses 724 may be address, data, or control buses, and may include any interconnection mechanism such as a series of lines on a motherboard or integrated circuit, fiber, optics or other optical communication equipment, and the like. Each of the one or more transceivers 723 may comprise a receiver and a transmitter, which are connected to one or more antennas 726. The network device 720 may operate as a base station for the UE 710 and wirelessly communicate with the UE 710 through the one or more antennas 726. The one or more network interfaces 727 may provide wired or wireless communication links through which the network device 720 may communicate with other network devices, entities or functions. The one or more memories 722 may include computer program code 725. The one or more memories 722 and the computer program code 725 may be configured to, when executed by the one or more processors 721, cause the network device 720 to perform processes and steps relating to the BS 140 as described above.

The one or more processors 711, 721 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 711, 721 may be configured to control other elements of the UE/network device and operate in cooperation with them to implement the procedures discussed above.

The one or more memories 712, 722 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 712, 722 may include but not limited to an electric, a magnetic, an optical, an electromagnetic, an infrared, or a semiconductor system, apparatus, or device or any combination of the above.

The network device 170 can be implemented as a single network node, or disaggregated/distributed over two or more network nodes, such as a central unit (CU), a distributed unit (DU), a remote radio head-end (RRH), using different functional-split architectures and different interfaces.

It would be understood that blocks in the drawings may be implemented in various manners, including software, hardware, firmware, or any combination thereof. In some embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some exemplary embodiments further provide computer program code or instructions which, when executed by one or more processors, may cause a device or apparatus to perform the procedures described above. The computer program code for carrying out procedures of the exemplary embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some exemplary embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

What is claimed is:

1. A user equipment comprising:

at least one processor; and at least one non-transitory memory storing instructions that, when executed with the at least one processor, cause the user equipment to:

receive a paging message from a network device, the paging message comprising an identity of the user equipment and an uplink grant, a timing advance for the user equipment, downlink data for the user equipment, a radio resource control setup or resume message, and a cell specific network radio temporary identifier for the user equipment;

adjust transmission timing based on the timing advance;

enter into a connected state from an idle or inactive state in response to the radio resource control setup or resume message, wherein the user equipment is in an idle or inactive state and was previously configured to store the timing advance during a prior transition to the idle or inactive state, and wherein the paging message is received in a context in which the user equipment has not changed cells since storing the timing advance; and transmit a signal to the network device using the uplink grant, wherein the signal comprises a response to acknowledge receipt of the downlink data, the radio resource control setup or resume complete message that is transmitted when the user equipment enters into the connected state, and a mode indicator indicating whether the user equipment is in a mode that supports the paging message, wherein the mode indicator is preconfigured in the user equipment to indicate support for an enhanced paging procedure optimized for limited-mobility in a factory working mode or stationary operation.

* * * * *